United States Patent
Yamada

[11] Patent Number: 6,008,069
[45] Date of Patent: Dec. 28, 1999

[54] FABRICATION PROCESS OF A SEMICONDUCTOR DEVICE INCLUDING A DICING PROCESS OF A SEMICONDUCTOR WAFER

[75] Inventor: Yutaka Yamada, Kawasaki, Japan

[73] Assignee: Fujitsu Limited, Kawasaki, Japan

[21] Appl. No.: 08/953,685

[22] Filed: Oct. 17, 1997

[30] Foreign Application Priority Data

Oct. 18, 1996 [JP] Japan ................................ 8-276348

[51] Int. Cl.⁶ .................................................. H01L 21/44
[52] U.S. Cl. ............................................ 438/113; 438/460
[58] Field of Search ................................... 438/113, 114, 438/460, 462, 467; 148/370

[56] References Cited

U.S. PATENT DOCUMENTS 5,288,342   2/1994   Job ............................................ 148/320

*Primary Examiner*—Kevin M. Picardat
*Attorney, Agent, or Firm*—Armstrong, Westerman, Hattori, McLeland, & Naughton

[57] ABSTRACT

A rotary dicing blade includes a rotary hub, a blade edge provided on the rotary hub along an outer periphery thereof, and abrasive particles provided on the blade edge, wherein the abrasive particles contain fullerene particles.

8 Claims, 8 Drawing Sheets

FABRICATION PROCESS OF A SEMICONDUCTOR DEVICE INCLUDING A DICING PROCESS OF A SEMICONDUCTOR WAFER

BACKGROUND OF THE INVENTION

The present invention generally relates to fabrication of semiconductor devices and more particularly to a fabrication process of a semiconductor device including a dicing process and a construction of a dicing blade used therefore.

In the fabrication of a semiconductor device, a number of semiconductor device patterns are formed on a single semiconductor wafer, wherein the semiconductor wafer thus formed with the device patterns is subjected to a dicing process in which the semiconductor wafer is divided into individual semiconductor chips. In the dicing process, a rotary dicing blade is used for sawing the semiconductor wafer along a predetermined dicing line defined on the semiconductor wafer.

In such a fabrication process of a semiconductor device, it is required to reduce the width of the dicing line as much as possible so as to maximize the number of the semiconductor chips obtained from a single semiconductor wafer. Further, in order to maximize the throughput of production, it is desired to maximize the feeding speed of the rotary dicing blade on the semiconductor wafer along the dicing line.

Figures 1A, 1B:
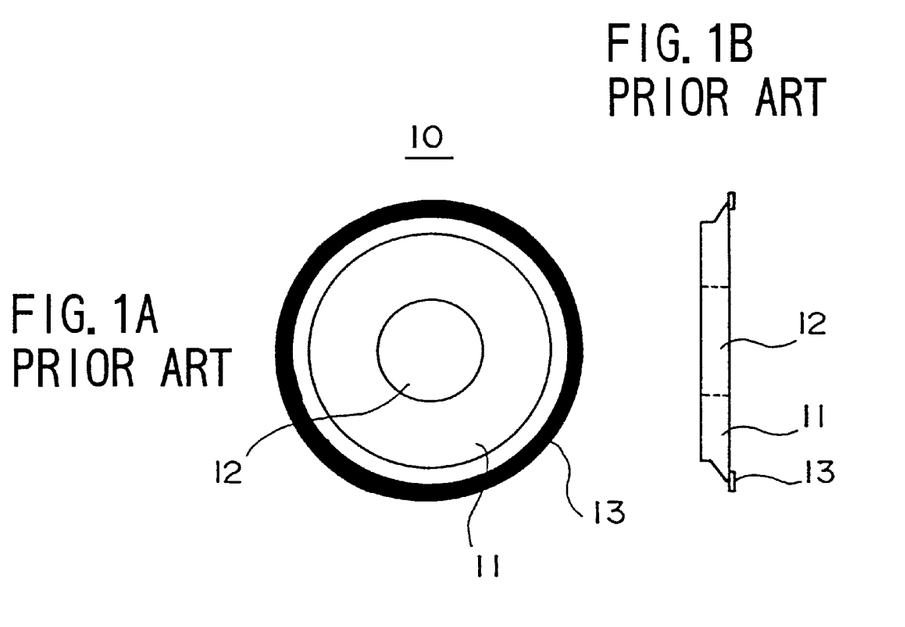
FIGS. 1A–1C are diagrams showing the construction of a conventional rotary dicing blade.
Figure 1C:
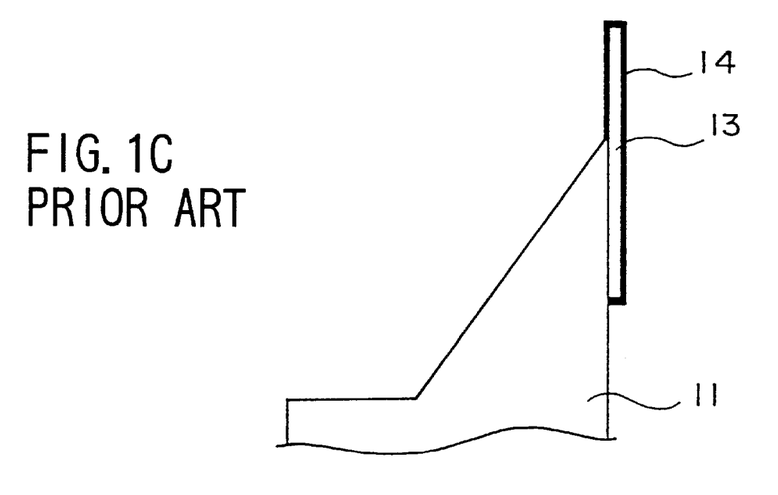

FIGS. 1A and 1B are diagrams showing the construction of a conventional rotary dicing blade 10 used in a conventional dicing process, wherein FIG. 1A shows the dicing blade 10 in a side view while FIG. 1B shows the dicing blade 10 in a front view. Further, FIG. 1C shows the dicing blade 10 in an enlarged view.

Referring to FIGS. 1A and 1B, the rotary dicing blade 10 includes a rotary hub 11 of an Al alloy and a blade edge 13 of Ni or a Ni alloy, wherein the hub 11 is formed with a hole 12 for accepting a rotary drive shaft of a dicing machine (not shown). Further, the blade edge 13 is formed along an outer circumference of the hub 11. As indicated in the enlarged view of FIG. 1C, the blade edge 13 carries thereon diamond abrasive particles.

Figure 2:
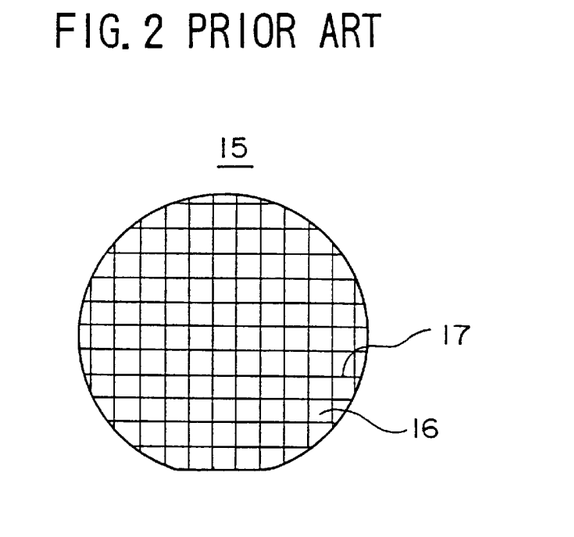
FIG. 2 is a diagram showing a semiconductor wafer together with dicing lines.

FIG. 2 shows a Si wafer 15 that is to be diced by the rotary dicing blade 10.

Referring to FIG. 2, a number of semiconductor chips 16 are defined on the Si wafer 15 by criss-crossing dicing lines 17, and the foregoing rotary dicing blade 10 saws the wafer 15 along the dicing lines 17. It should be noted that each semiconductor chip 16 includes a number of semiconductor elements (not shown) therein and forms an integrated circuit.

Figure 3:
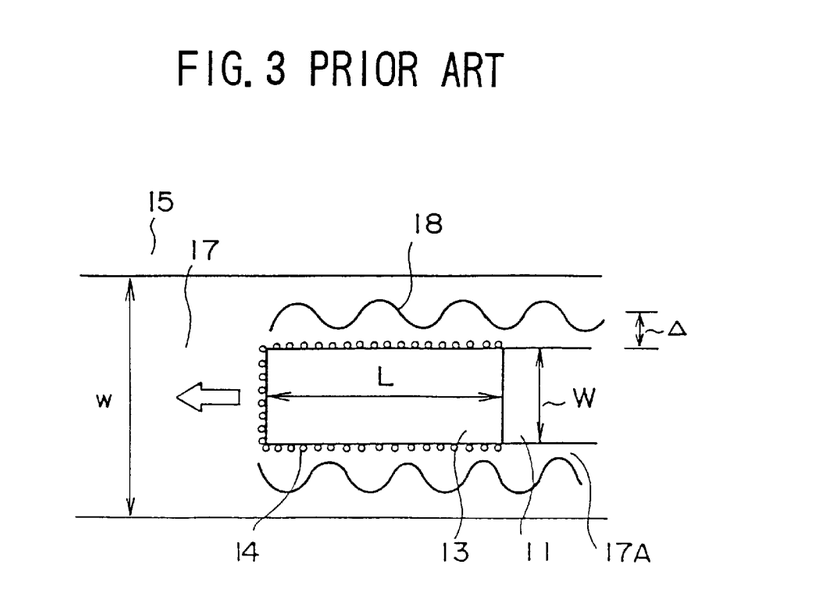
FIG. 3 is a diagram showing a dicing groove formed in a semiconductor wafer in detail.

FIG. 3 shows an example of dicing the Si wafer 15 along a dicing line 17 of FIG. 2 by the rotary dicing blade 10 of FIGS. 1A–1C.

Referring to FIG. 3, the dicing line 17 has a width w of about 150 µm, and a dicing groove 17A having a width corresponding to a width W of the blade edge 13 is formed inside the dicing line 17. In a typical example, the blade edge 13 has an edge length L of about 700 µm and an edge width W of about 60 µm. The blade edge 13 carries, on a circumferential surface and on both lateral surfaces thereof, diamond abrasive particles 14 having a grain size of 4–8 µm. The diamond abrasives 14 may be electro-deposited on the blade edge 13.

As can be understood from FIG. 3, the dicing groove 17A thus formed by the rotary dicing blade 10 is defined by irregular side walls 18. The projections and depressions thus formed on the side walls 18 is called a "chipping" and are designated by Δ. Thus, in order to minimize the width w of the dicing line 17, it is necessary to minimize the chipping Δ also. In the case of a dicing process conducted by the rotary dicing blade 10 of the foregoing construction, it is necessary to set the feeding speed of the blade 10, in other words the relative speed of the rotary dicing blade 10 with respect to the semiconductor wafer 15, to be less than 100 mm/sec in order to suppress the chipping Δ below about 30 µm. However, the use of such a low feeding speed of the dicing blade 10 inevitably raises the problem of reduced throughput of production of the semiconductor device. Further, the use of such a low feeding speed for the dicing blade causes a problem of reduced lifetime of the blade 10 because of the increased time needed for completing one dicing pass. In the case of dicing a Si wafer of a six inch diameter, fifty-thousand passes are considered the maximum lifetime of the blade 10.

In the construction of FIG. 3, it has been necessary to reduce the edge length L of the rotary dicing blade 10 to about 500 µm when the width w of the dicing line 17 is going to be reduced to about 90 µm. In correspondence to this, it has been necessary to reduce the edge width W to about 45 µm. Further, it has been necessary to reduce the feeding speed of the blade 10 to below about 60 mm/sec in order to suppress the chipping Δ below about 20 µm. Thereby, the throughput of production of the semiconductor device is reduced further. Further, because of the increased time needed for one dicing pass as a result of the reduced feeding speed of the rotary dicing blade, the lifetime of the rotary dicing blade 10 of the foregoing construction is reduced to about thirty thousand passes in the case of dicing a six inch Si wafer.

While it may be possible to increase the lifetime of the rotary dicing blade by increasing the edge length L of the blade edge 13, such an approach tends to invite a problem of increased degree of deflection or deformation of the blade edge 13. Thereby, the reduction of the feeding speed of the rotary dicing blade is inevitable. For example, the feeding speed has to be suppressed below 70 mm/sec.

SUMMARY OF THE INVENTION

Accordingly, it is a general object of the present invention to provide a novel and useful fabrication process of a semiconductor device including a dicing process wherein the foregoing problems are eliminated.

Another object of the present invention is to provide a dicing blade applicable to a dicing process conducted along a narrow dicing line with a high speed and a dicing process conducted by such a dicing blade, as well as a fabrication process of a semiconductor device including the dicing process conducted by the dicing blade.

Another object of the present invention is to provide a rotary dicing blade, comprising:

a rotary hub;

a blade edge provided on said rotary hub along an outer periphery thereof; and     abrasive particles provided on said blade edge;

said abrasive particles comprising fullerene particles.

Another object of the present invention is to provide a method of dicing a wafer, said method comprising a step of dicing,said wafer by a rotary dicing blade, said rotary dicing blade comprising:

a rotary hub;

a blade edge provided on said rotary hub along an outer periphery thereof; and abrasive particles provided on said blade edge;

said abrasive particles comprising fullerene particles.

Another object of the present invention is to provide a method of fabricating a semiconductor device including a step of dicing a semiconductor substrate;

said step of dicing being conducted by a rotary dicing blade comprising:

a rotary hub;

a blade edge provided on said rotary hub along an outer periphery thereof; and abrasive particles provided on said blade edge;

said abrasive particles comprising fullerene particles.

According to the present invention, it is possible to suppress the chipping without decreasing the feeding speed of the dicing blade, as a result of the use of the fullerene particles for the abrasives of the rotary dicing blade.

Other objects and further features of the present invention will become apparent from the following detailed description when read in conjunction with the attached drawings.

DETAILED DESCRIPTION OF THE PREFERRED EMBODIMENTS

Figure 4:
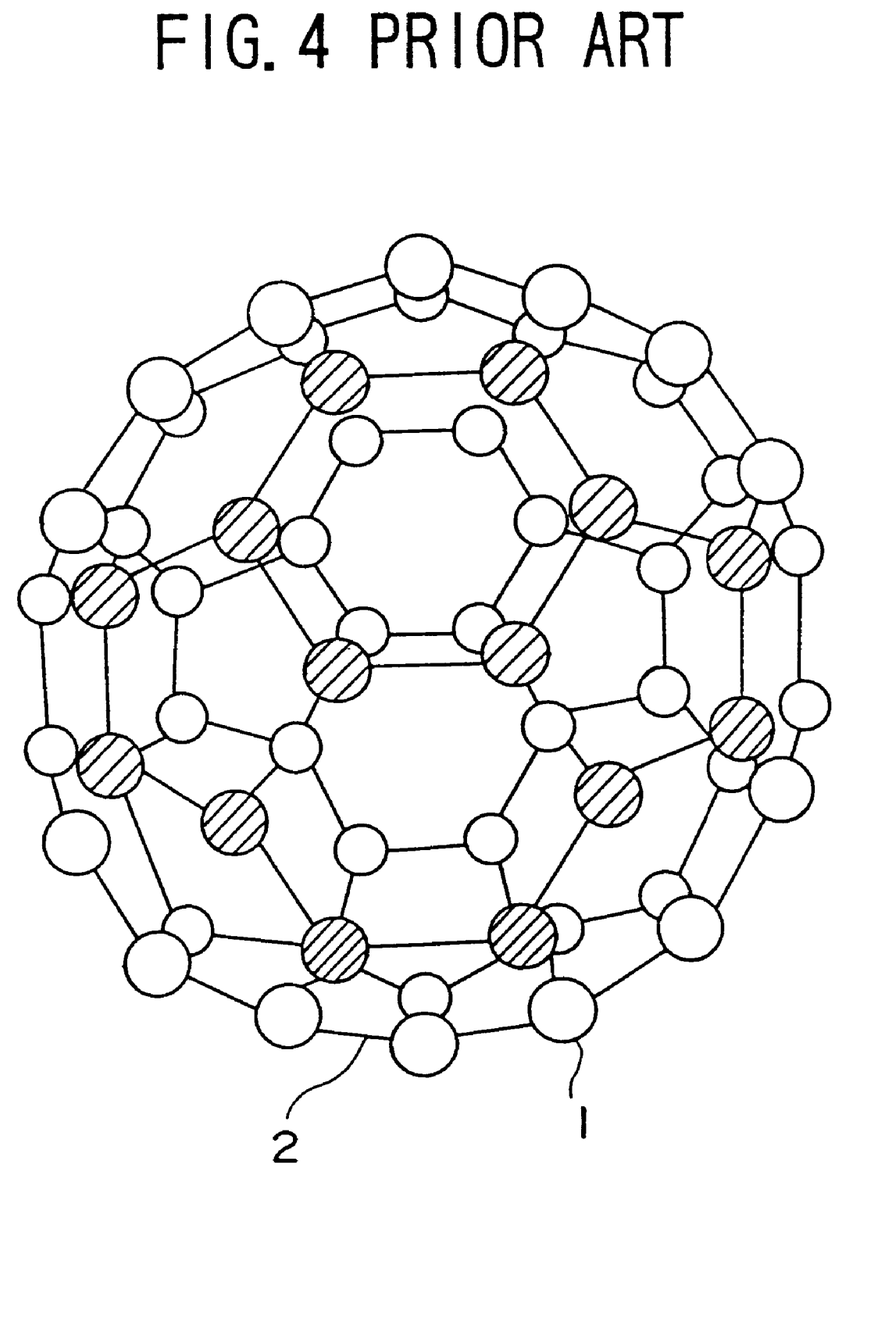
FIG. 4 is a diagram showing a molecular structure of fullerene C60.

FIG. 4 shows the molecular structure of a fullerene known as C60.

Fullerene is an allotrope of C discovered on 1985. A fullerene molecule has a hollow, succor-ball-like network structure in which sixty C atoms 1, bonded each other by a covalent bond 2, form hexagons and pentagons repeated alternately. A fullerene molecule has a size of 7 Å and a molecular theoretical analysis suggests a hardness exceeding the hardness of diamond. Other than the C60 structure, a C70 structure is known as a stable molecular structure of fullerene. Further, there is a possibility of higher-order fullerenes such as C960 or a heterofullerene that contains a metal atom.

Thus, the present invention uses a fullerene for the abrasive particles of the rotary dicing blade in place of conventional diamond abrasive particles. By using a fullerene for the abrasive particles, it is possible to reduce the problem of chipping as will be explained later.

As a consequence of the reduced chipping, it becomes possible to reduce the width of the dicing line on the semiconductor wafer, and the number of the semiconductor chips obtainable from a single semiconductor wafer is increased accordingly. Further, it is not necessary to reduce the feeding speed of the dicing blade for suppressing the chipping, and thus, the problem of reduction of the throughput of production does not occur in the present invention. Further, the lifetime of a rotary dicing blade is extended.

Figure 5:
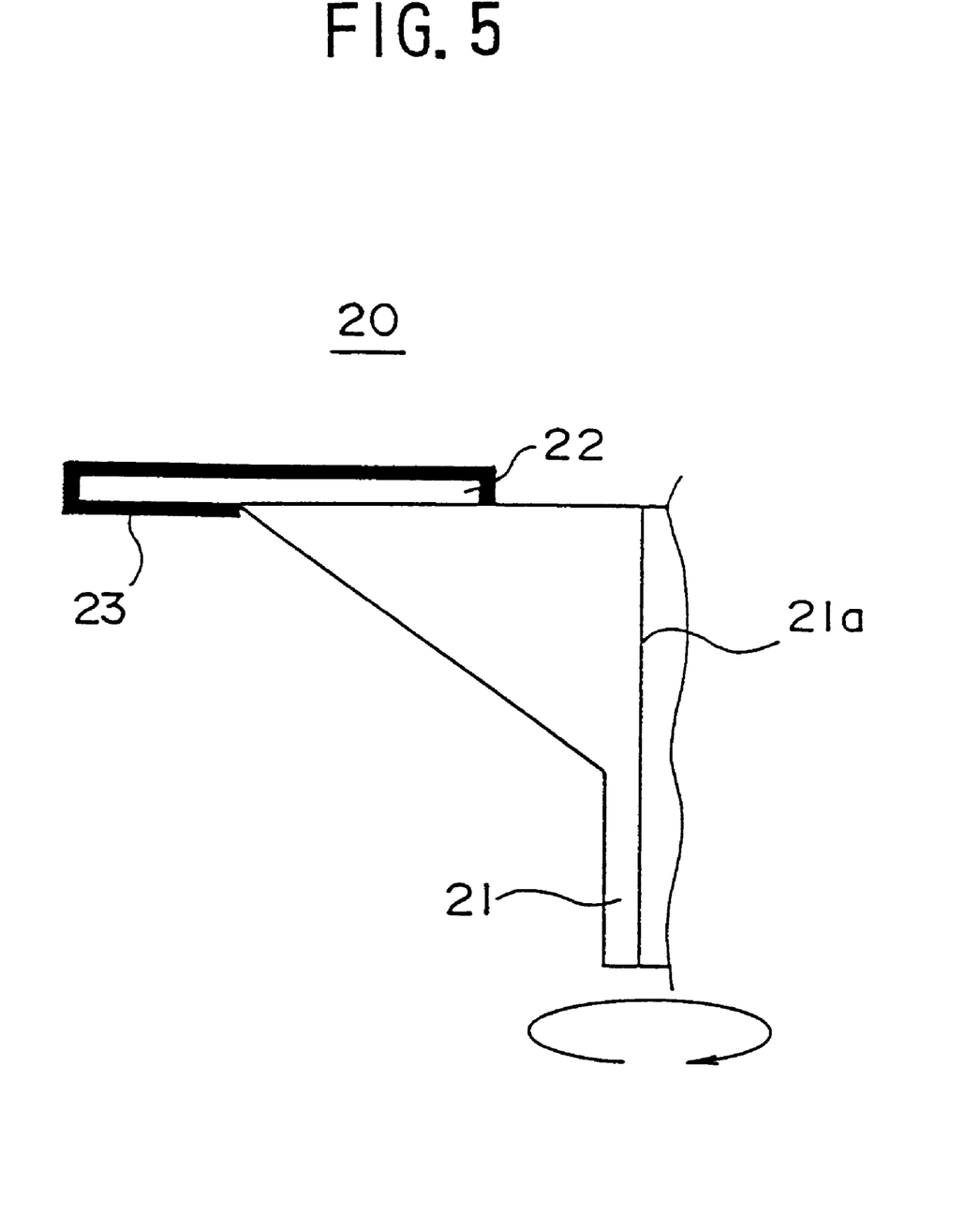
FIG. 5 is a diagram showing the construction of a rotary dicing blade according to a first embodiment of the present invention.

FIG. 5 shows the construction of a rotary dicing blade 20 according to a first embodiment of the present invention.

Referring to FIG. 5, the rotary dicing blade 20 includes a rotary hub 21 of an Al alloy formed with a hole 21a for accepting a drive shaft of a driving apparatus (not shown), and a blade edge 22 of Ni or a Ni alloy is provided on the rotary hub 21 along an outer periphery thereof. The blade edge 22 is covered by a metal layer 23 of Ni or a Ni alloy in which particles of fullerene C60 of FIG. 4 are dispersed. The blade edge 22 may have an edge length L of about 1.2 mm and an edge width W of about 60 $\mu$m.

Figure 6:
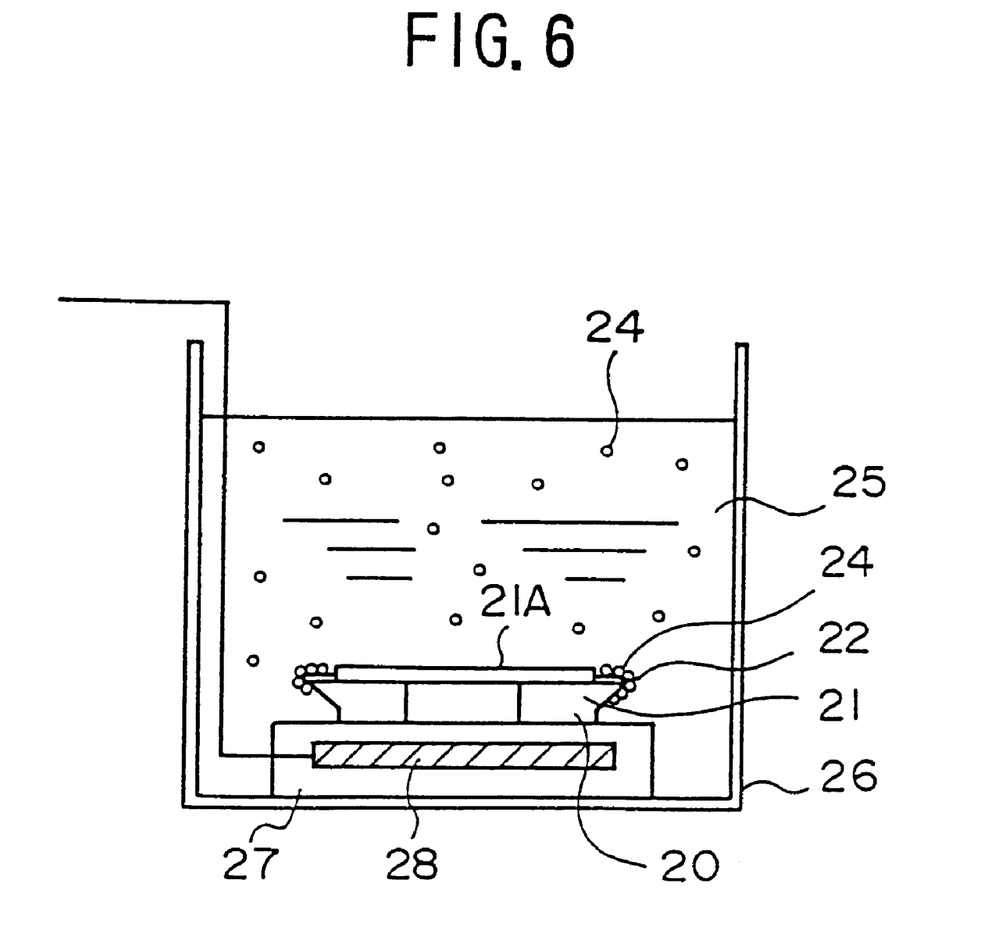
FIG. 6 is a diagram showing a process of causing a deposition of fullerene particles on said rotary dicing blade of FIG. 5.

FIG. 6 shows a part of the manufacturing process of the rotary dicing blade 20 of FIG. 5.

Referring to FIG. 6, a stage 27 of a metal such as Al is provided on a bottom of a tank 26, and the tank 26 is filled by water 25. Further, fullerene particles 24 are dispersed in the wafer to form a suspension. The fullerene particles may have a diameter of several Angstroms to several nanometers. Further, the rotary dicing blade 20 is placed on the stage 27 horizontally in a state that the rotary hub 21 carries the blade edge 22.

It should be noted that the stage 27 includes therein a carbon electrode 28, and a negative voltage is applied to the carbon electrode 28. Thereby, the fullerene particles 24, having a positive electric charge, cause an electrophoresis and are moved toward the hub 21. The fullerene particles 24 thus moved to the hub 21 then cause a deposition of the blade edge 22. In this deposition process, it is preferable to cover the hub 21 by a mask 21A such that only the blade edge 22 is exposed. The density of the deposited fullerene particles are controlled by adjusting the concentration of the fullerene particles 24 in the suspension 25.

Figure 7A:
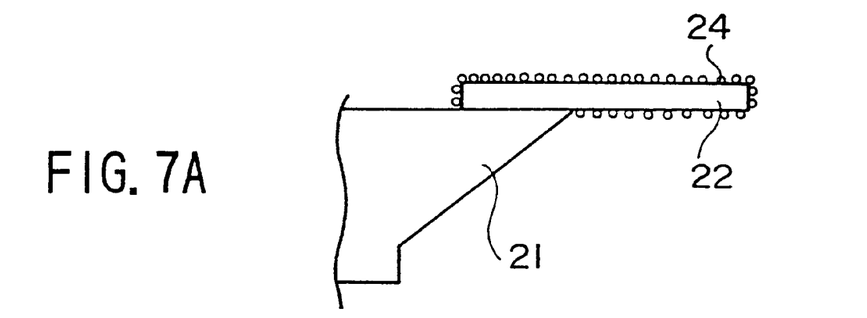
FIGS. 7A–7C are diagrams showing manufacturing steps of the rotary dicing blade of FIG. 5.

FIG. 7A shows a half-product of the rotary dicing blade 20 obtained by the process of FIG. 6.

Figure 7B:
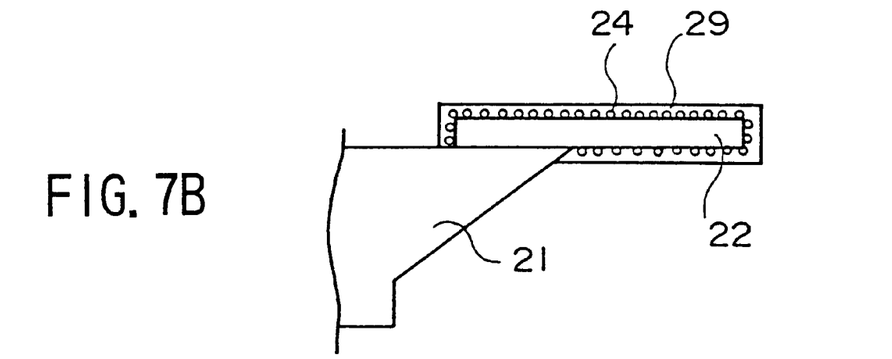

After the step of FIG. 7A, a step of FIG. 7B is conducted such that a metal layer 29 is deposited on the blade edge 22 so as to cover the fullerene particles already deposited thereon in the step of FIG. 6, by a vapor phase deposition process or an electroplating process. Further, a step of FIG. 7C is conducted in which a resin protective coating 30 is provided on the foregoing metal layer 29, wherein a so-called metal bond may be used for the protective coating 30.

Figure 7C:
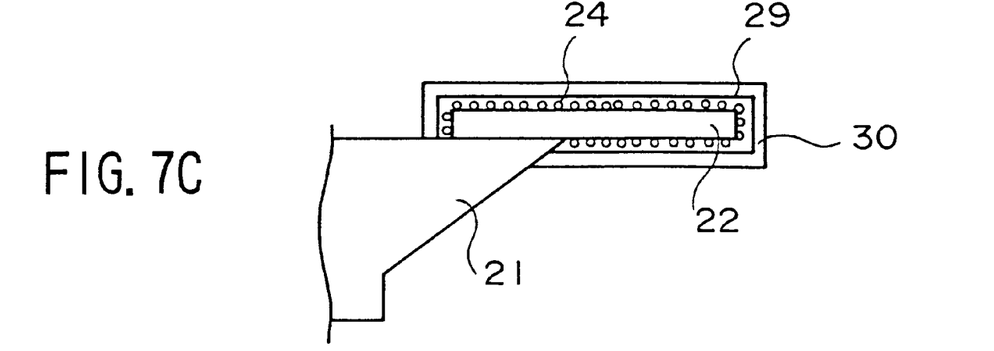
Figure 8:
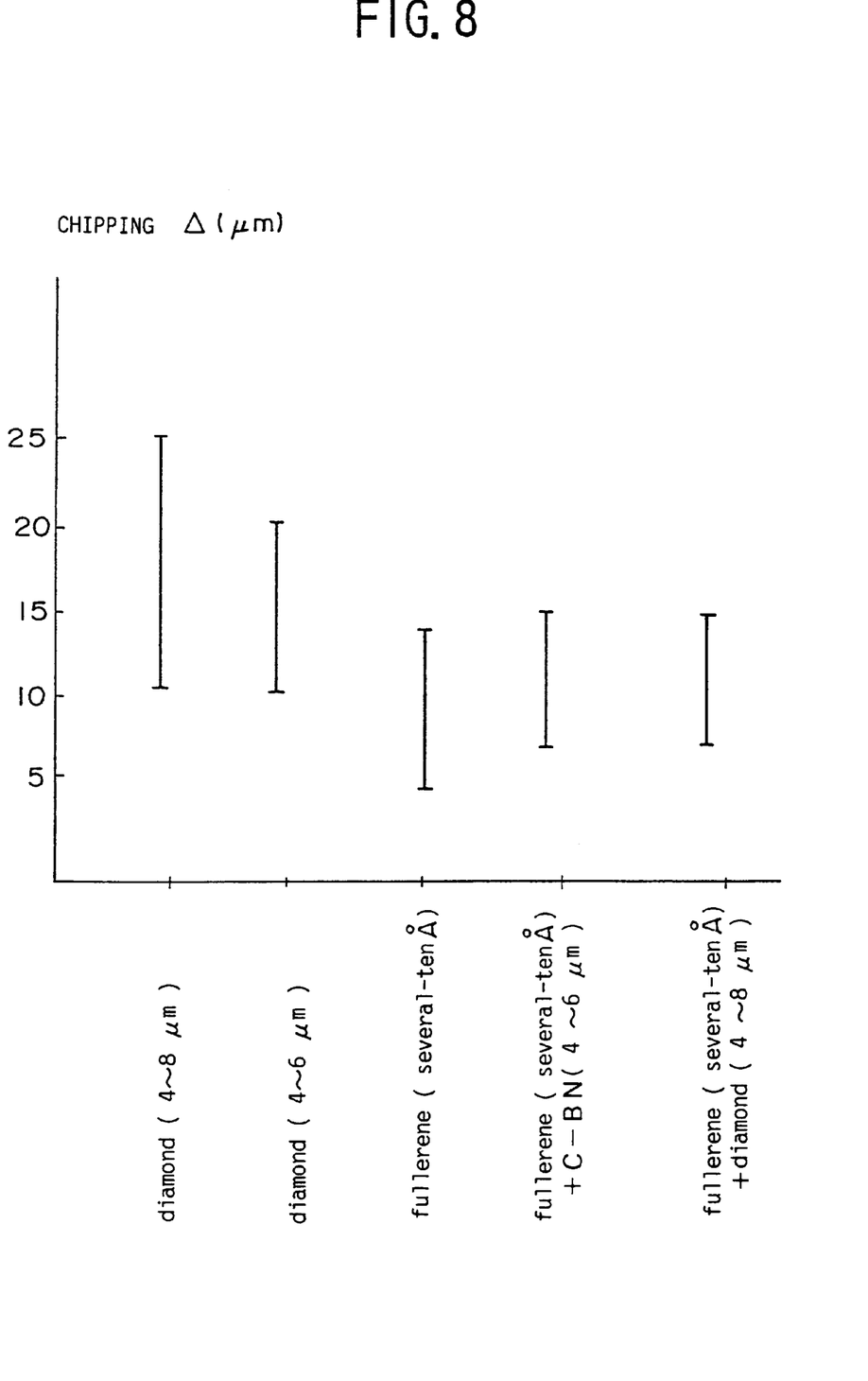
FIG. 8 is a diagram showing the effect of chipping suppression achieved by the rotary dicing blade of the present invention in comparison with a conventional dicing process conducted by a conventional rotary dicing blade.

FIG. 8 shows a maximum chipping $\Delta$ observed when dicing a Si wafer by the rotary dicing blade 20 of FIGS. 7A–7C, wherein the result of FIG. 8 is for the case of dicing a Si wafer by setting the edge width W to about 60 $\mu$m and the feeding speed to about 100 mm/sec. The dicing is made along a dicing line having a width of about 90 $\mu$m. As explained already with reference to FIG. 3, the chipping $\Delta$ represents the magnitude of projections and depressions formed at one side of the blade edge 22.

Referring to FIG. 8, it can be seen clearly that the maximum chipping $\Delta$ can be suppressed below about 15 $\mu$m when the fullerene particles having a diameter of several ten Angstroms are used for the abrasive particles. In the conventional case of using diamond particles having a diameter of 4–8 μm, on the other hand, the maximum chipping Δ reaches as much as 25 μm under the same dicing condition. Even in the case of using diamond particles having a smaller diameter of 4–6 μm for the same purpose, a maximum chipping Δ of about 20 μm cannot be avoided.

The foregoing results clearly indicate that the chipping Δ is effectively and successfully suppressed without reducing the feeding speed of the rotary dicing blade, by using the fullerene particles for the abrasives. As a consequence of the decrease of the chipping Δ, the width of the dicing line can also be reduced. As it is not necessary to reduce the feeding speed in the present invention for reducing the chipping as noted above, the problem of decreased lifetime of the rotary dicing blade is successfully eliminated and more than fifty thousand passes can be made when dicing Si wafers of a six inch diameter by using a rotary dicing blade having a blade with W of 45 μm. It should be noted that this number of passes has conventionally been achieved by using a blade having a blade width W of 60 μm.

FIG. 8 further shows the result in which a mixture, in which the fullerene particles having a diameter of several ten Angstroms and CBN (carbon boron nitride) particles having a diameter of 4–6 μm are mixed with a proportion of about 1:1, is used for the abrasives. FIG. 8 further shows the result in which a mixture, in which the fullerene particles having a diameter of several ten Angstroms and diamond particles having a diameter of 4–6 μm are mixed with a proportion of about 1:1, is used for the abrasives. In both cases, it is noted that the maximum chipping Δ can be reduced below about 15 μm.

In the present invention, the fullerene used for the abrasive particles is by no means limited to the C60 molecule shown in FIG. 4 but other fullerene molecules such as C70 or C960 or a heterofullerene molecule containing a metal atom may also be used.

Figure 9:
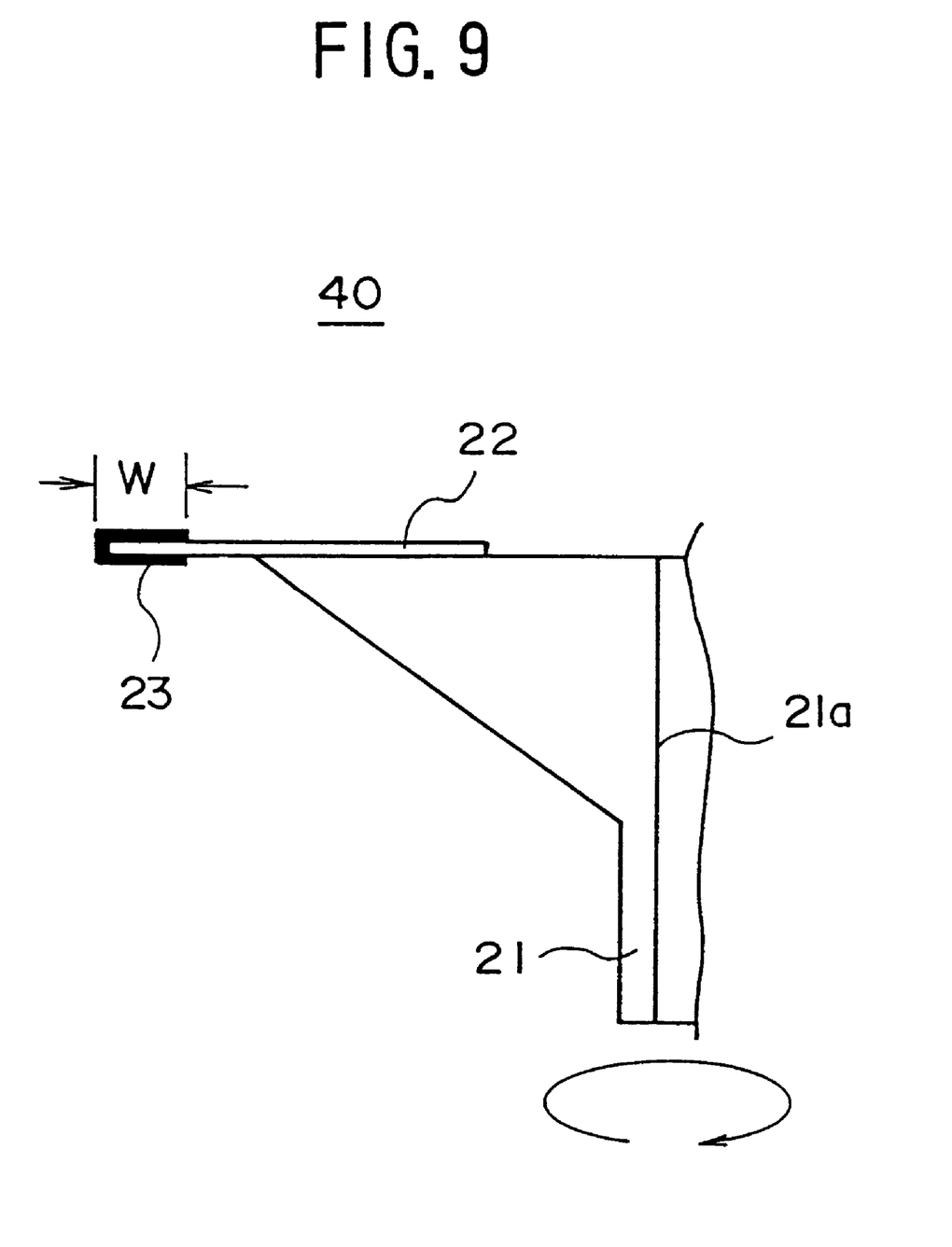
FIG. 9 is a diagram showing a second embodiment of the present invention.

FIG. 9 shows the construction of a rotary dicing blade 40 according to a second embodiment of the present invention, wherein those parts corresponding to the parts described previously are designated by the same reference numerals and the description thereof will be omitted.

Referring to FIG. 9, the rotary dicing blade 40 carries the metal layer 23 in which the fullerene particles are dispersed not on the entire surface of the blade edge 22 but only on the outer marginal part thereof. The rotary dicing blade 40 can also provide the dicing characteristic of FIG. 8.

Further, the present invention is not limited to the preferred embodiments described heretofore but various variations and modifications may be made without departing from the scope of the invention.

What is claimed is:

1. A method of dicing a wafer, said method comprising a step of dicing said wafer by a rotary dicing blade, said rotary dicing blade comprising:

a rotary hub;

a blade edge provided on said rotary hub along an outer periphery thereof; and abrasive particles provided on said blade edge;

said abrasive particles comprising fullerene particles.

2. A method as claimed in claim 1, wherein said abrasive particles essentially consist of fullerene.

3. A rotary dicing blade as claimed in claim 1, wherein said abrasive particles further include diamond abrasive particles.

4. A rotary dicing blade as claimed in claim 1, wherein said abrasive particles further include carbon BN particles.

5. A method of fabricating a semiconductor device including a step of dicing a semiconductor substrate;

said step of dicing being conducted by a rotary dicing blade comprising:

a rotary hub;

a blade edge provided on said rotary hub along an outer periphery thereof; and abrasive particles provided on said blade edge;

said abrasive particles comprising fullerene particles.

6. A method as claimed in claim 5, wherein said abrasive particles essentially consist of fullerene.

7. A rotary dicing blade as claimed in claim 5, wherein said abrasive particles further include diamond abrasive particles.

8. A rotary dicing blade as claimed in claim 5, wherein said abrasive particles further include carbon BN particles.

\* \* \* \* \*